United States Patent
Cohen (10) Patent No.: US 7,710,858 B1
(45) Date of Patent: May 4, 2010

(54) APPARATUS, SYSTEM, AND METHOD FOR SAMPLE TIMING SYNCHRONIZATION IN A RECEIVER

(75) Inventor: Elik E. Cohen, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 779 days.

(21) Appl. No.: 11/229,279

(22) Filed: Sep. 16, 2005

(51) Int. Cl.
*H04J 11/00* (2006.01)
(52) U.S. Cl. .................... 370/210; 370/208
(58) Field of Classification Search ......... 370/204–210, 370/503, 509, 510, 506, 350, 519, 517; 375/343, 375/362
See application file for complete search history.

(56) References Cited

U.S. PATENT DOCUMENTS

| | | | |
|---|---|---|---|
| 6,993,083 B1 * | 1/2006 | Shirakata et al. | 375/260 |
| 7,136,432 B2 * | 11/2006 | Min et al. | 375/326 |
| 7,318,089 B1 * | 1/2008 | Stachura et al. | 709/223 |
| 2004/0228272 A1 * | 11/2004 | Hasegawa et al. | 370/210 |

* cited by examiner

*Primary Examiner*—Jason E Mattis
*Assistant Examiner*—Dady Chery
(74) *Attorney, Agent, or Firm*—Cooley Godward Koronish LLP (57) ABSTRACT

A FFT module for a baseband processor of a receiver includes an input for receiving a timing window correction signal. In response to the timing window correction signal the FFT module adjusts a timing window for processing groups of samples within an input queue of the FFT module.

14 Claims, 7 Drawing Sheets

FIG. 7

APPARATUS, SYSTEM, AND METHOD FOR SAMPLE TIMING SYNCHRONIZATION IN A RECEIVER

FIELD OF THE INVENTION

The present invention is generally related to receivers in which sample timing synchronization is required. More particularly, the present invention is directed towards orthogonal frequency division multiplexed (OFDM) receivers requiring sample timing synchronization.

BACKGROUND OF THE INVENTION

Orthogonal frequency division multiplexed (OFDM) transceivers are of interest for wireless local area networks (WLANs). One example of a WLAN transceiver of commercial interest is a transceiver compliant with the Institute of Electrical and Electronics Engineers (IEEE) 802.11 standard, such as the 802.11a and 802.11g standards. In addition to applications in WLAN systems, OFDM is also used in asymmetric digital subscriber line services (ADSL), digital audio broadcast, digital terrestrial television broadcasting in some nations, and in proposed 4G metro area network and wide area network systems, such as those described in IEEE standards 802.11n, 802.16, and 802.20.

An OFDM system carries information in a frequency multiplex to increase the data rate. The total channel bandwidth is divided into multiple subchannels to increase the bandwidth and reduce interference effects. That is, in an OFDM system the carrier centers are placed on orthogonal frequencies and subcarriers are spaced apart by a characteristic time. OFDM transceivers are robust in multi-path environments. Additionally, forward error correction (FEC) codes permit the recovery of certain types of errors. However, OFDM transceivers are sensitive to frequency, clock, and phase offset.

In an OFDM system the basic unit of data is called a symbol which has a corresponding symbol duration. Each carrier has a fixed phase and amplitude for a particular symbol. The modulation attributes are then changed for the next symbol. Modulation and demodulation are achieved by the use of an inverse discrete Fourier transform (e.g., an Inverse Fast Fourier Transform (IFFT)) and discrete Fourier transform (e.g., a Fast Fourier Transform (FFT)), respectively.

Figure 1:
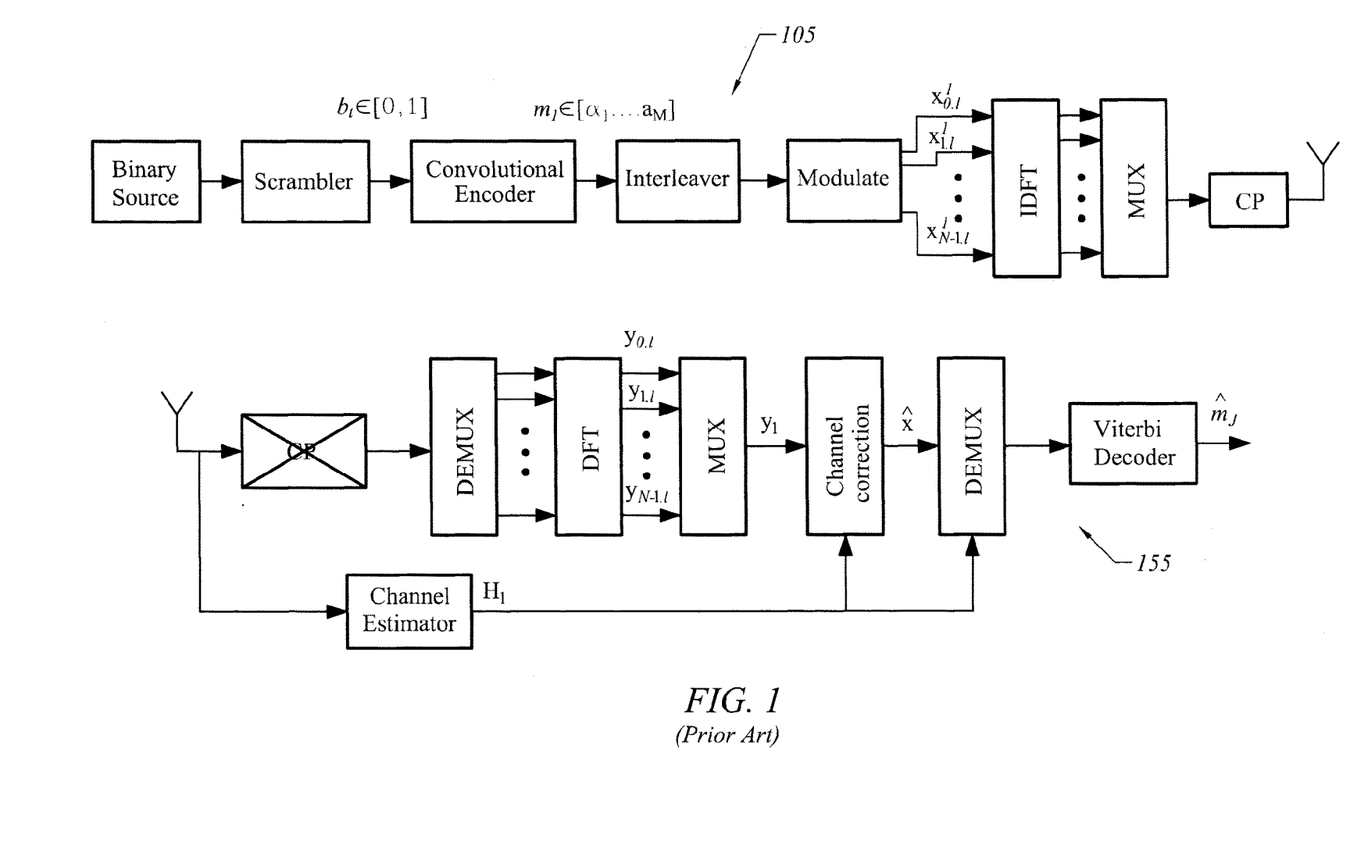
FIG. 1 is a block diagram of a prior art wireless local area network transceiver.

FIG. 1 illustrates a conventional prior art WLAN transceiver including an OFDM transmitter 105 and OFDM receiver 155. The transmitter 105 includes a data scrambler, convolutional encoder, interleaver, modulator, inverse discrete Fourier transform (IDFT) module, multiplexer, and a cyclic prefix (CP) module to generate guard symbols. The scrambled data sequence is convolutionally encoded. A puncturing technique may be used to achieve a ratio of uncoded bits to coded bits that is greater than a mother code. Interleaving of the convolutionally encoded bits prevents error bursts. The interleaved encoded bits are grouped together into groups arranged to form symbols. The symbols are then modulated and an OFDM symbol is generated using IDFT. The IDFT output is converted to a serial sequence and a guard duration is added.

The receiver 155 includes modules that perform operations inverse to those of the transmitter and that are performed in a reverse order such that binary data is recovered. As one example, modules may be included to remove guard symbols, perform demuxing operations, discrete Fourier transformation (DFT), channel correction, and viterbi decoding to undue the convolutional encoding. The DFT module is typically implemented as a Fast Fourier Transform (FFT) module. The FFT is an efficient implementation of the discrete Fourier Transform. An FFT module for a communication system utilizes a sequence of multiply-and-add operations that are typically implemented in digital systems as a pipeline having a sequence of butterfly stages that operate upon an M-length initial input, where M is a power of two integer. Conventionally, data buffers are provided at the input of the FFT module and between data stages of the FFT module to permit all of the received data to be processed in parallel in the proper sequence through the various butterfly stages and multiply-and-add operations in the proper sequence.

Receiver 155 must perform a timing recovery operation. An initial timing recovery operation is essential for the receiver to be initially synchronized with the output of the transmitter. Moreover, in a typical OFDM environment timing and carrier errors have to be corrected dynamically to achieve an acceptable signal-to-noise ratio in a multipath environment.

Synchronization in OFDM receiver 155 typically includes an initial synchronization process that includes aligning the receiver to the symbol rate of the transmitted signal. Additionally, frame detection, carrier offset estimation and correction, and sampling error correction are performed to determine FFT windows to decode the signal.

Figure 2:
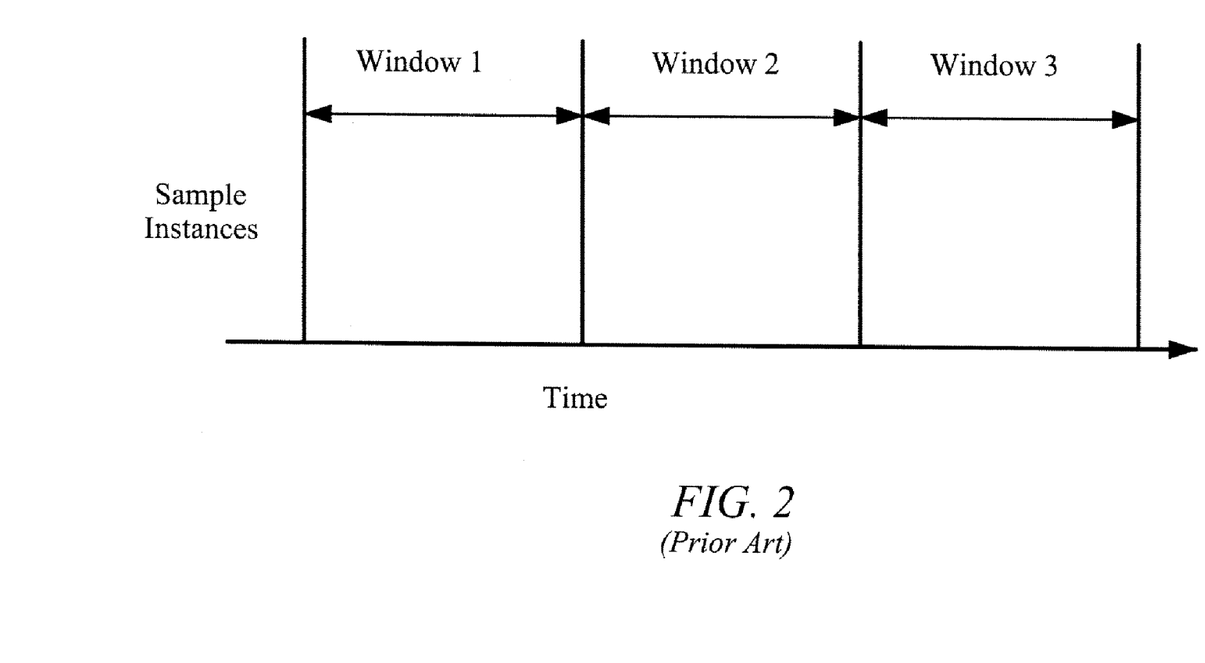
FIG. 2 illustrates FFT timing windows for a receiver in the system of FIG. 1.

Conventionally, an input sample FIFO queue (not shown in FIG. 1) in OFDM receiver 155 receives the input stream and a timing window is selected that defines groups of samples that are sent to the FFT module for subsequent FFT processing. As illustrated in FIG. 2, one aspect of the operation of receiver 155 is defining FFT timing windows which define groups of samples in the FIFO that are sent to the FFT module for FFT processing. Each group of samples that is processed corresponds to one symbol. For example, in many OFDM system an OFDM symbol corresponds to 80 samples. Of the 80 samples, 16 typically correspond to guard samples and the remaining 64 samples correspond to symbol data.

A loop filter (not shown in FIG. 1) is typically used to provide dynamic correction of timing and carrier errors. However, the loop filter may underflow or overflow. Consequently, a correction to the timing window applied to the input FIFO must be provided. In particular, if sample synchronization is lost, the timing window must be adjusted. A fine adjustment of the timing window may be implemented by generating a signal to skip or repeat a sample, i.e., to adjust the timing window up or down by one sample, respectively.

Figure 3:
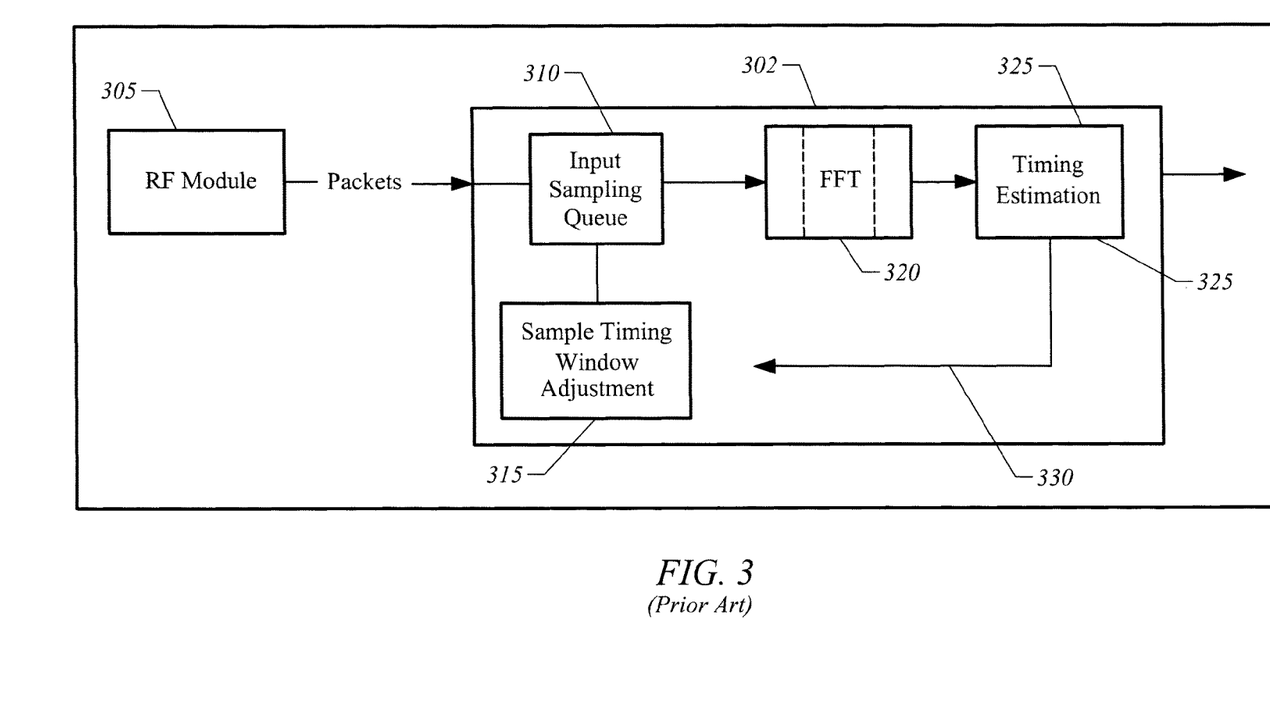
FIG. 3 illustrates aspects of a prior art sample synchronization technique for use in the system of FIG. 1.

FIG. 3 illustrates some of the sample synchronization problems in prior art WLAN receiver systems. An RF module 305 receives the transmitted OFDM signal and performs an initial demodulation process to generate data packets which are received in a baseband processor 302. For the purposes of illustration, some components of baseband processor 302 are omitted for clarity. An input queue 310 receives input samples. A sample timing window adjustment module 315 defines groups of samples corresponding to symbols received by FFT module 320. FFT module 320 may, for example, be a multi-stage FFT module that receives data samples corresponding to an M length input and then processes the samples in a conventional arrangement of FFT stages having appropriate data buffers between stages. A timing estimation module 325 (e.g., a coarse timing estimation module) is used to determine corrections to the sample timing window required to provide sample synchronization for use by sample timing window adjustment module 315.

However, note there is a feedback delay along path 330 between the initial time when a synchronization error is detected and when the sample timing window is adjusted. However, FFT module 320 performs nonlinear mathematical operations (e.g., quantization, rounding, and clipping) such that it is difficult to correct the output of FFT module 320 without a large performance loss. As a result, all of the data that was input to the FFT module with an incorrect sample timing window before sample timing window adjustment module 315 corrects the timing window is processed with the wrong sample timing window, increasing the likelihood of generating errors in subsequent decoding operations.

As an illustrative example, suppose FFT module 320 outputs a first symbol having a timing error, i.e., incorrect sample synchronization. The error in the first symbol is detected by timing estimation module 325. Due to the pipelined architecture at approximately the same time, a second group of samples corresponding to a second symbol enters FFT module 320. In the best case scenario that the feedback delay 330 is short in duration, the sample window timing adjustment module 315 will correct the timing window for a third group of samples corresponding to a third symbol. However, note that the second group of symbols has already been received in the input buffer of FFT module 320 before its timing could be corrected. That is, in the best case scenario after a timing error is detected in a first symbol output from FFT module 320, the second subsequent symbol received by FFT module 320 will still be processed with an incorrect timing window. In this example it will not be until at least the third symbol that the FFT processes samples with the correct timing window.

In light of the problems described above, the inventive apparatus, system, and method was developed.

SUMMARY OF THE INVENTION

A fast Fourier transform (FFT) module for a baseband processor of a receiver includes an input for receiving a timing window correction signal. In response to the timing window correction signal the FFT module adjusts a timing window for processing groups of samples within an input queue of the FFT module.

One embodiment of a FFT module comprises: an input queue for receiving samples to be buffered for FFT processing; and a queue controller operative in response to an error signal to adjust a timing window defining a group of samples in the input queue for FFT processing; the FFT module is operative to perform FFT processing upon each group of samples defined by the timing window.

One embodiment of a method of operating a Fast Fourier Transform (FFT) module in a baseband processor of a receiver comprises: receiving a FFT timing window correction signal in the FFT module; and in the FFT module, adjusting a timing window applied to define groups of samples in an input queue of the FFT module for subsequent FFT processing in response to the window timing correction signal.

One embodiment of an orthogonal frequency division multiplexed (OFDM) baseband processor comprises: a Fast Fourier Transform (FFT) Module adapted to adjust a FFT timing window upon samples within an input queue of the FFT module in response to a timing window correction signal; and a tracker operative to monitor an output of the FFT module and generate said timing window correction signal.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 4:
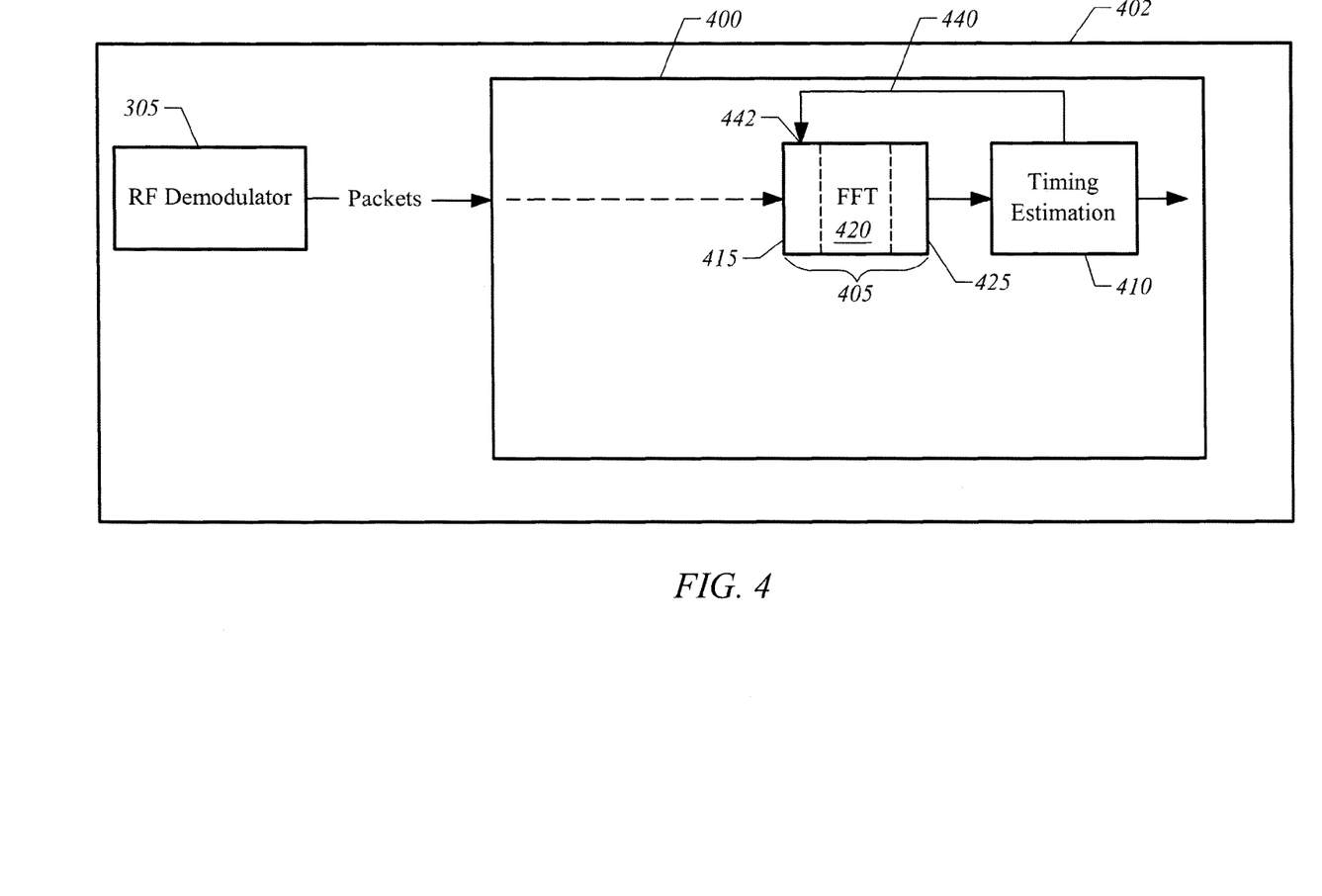
FIG. 4 illustrates a portion of a baseband processor in accordance with one embodiment of the present invention.

FIG. 4 is a block diagram illustrating a baseband processor 400 for processing data packets received from an radio frequency (RF) block 305 of an orthogonal frequency division multiplexed (OFDM) receiver 402. For example, RF block 305 may perform an initial step of demodulation to shift the frequency of an incoming OFDM signal centered about a carrier frequency to a baseband range of frequencies, i.e., a range of frequencies in which the carrier frequency has been removed. In one embodiment OFDM receiver 402 is a wireless local area network (WLAN) receiver.

A fast Fourier transform (FFT) module 405 is organized as a multi-stage module, such as a module having three or more stages 415, 420, and 425. Input stage 415 receives a serial stream of samples and then processes groups of samples having a number of samples corresponding to OFDM symbols according to a timing window to convert information in the time domain to the frequency domain for further processing in baseband processor 400. The processing in FFT module 405 is a pipeline configuration in which data is processed from one stage and then sent to the next subsequent stage for additional processing. Each stage 420 and 425 of FFT module 405 subsequent to input stage 415 performs nonlinear mathematical operations used to perform FFT processing, such as butterfly operations and multiply and add operations. Additionally, each stage includes a data buffer to facilitate proper FFT processing of data.

A timing estimation module 410 is coupled to the output of FFT module 405 and generates an error signal 440 indicative of changes required to the FFT timing window that is coupled to an input 442 of input stage 415. In one embodiment, the error signal 440 is a timing window correction signal, such as a skip or repeat command that shifts the FFT sample timing window within input stage 415 up or down by a duration corresponding to increments of one sample. Correcting sample synchronization within FFT module 405 improves receiver performance by reducing the number of symbols for which data within FFT module 405 is processed with an incorrect sample window after an error signal 440 is generated by timing estimation module 410. In particular, in the best case after a timing error is detected in a first symbol output from FFT module 405, data for the next symbol will be properly synchronized within FFT module 405.

Figure 5:
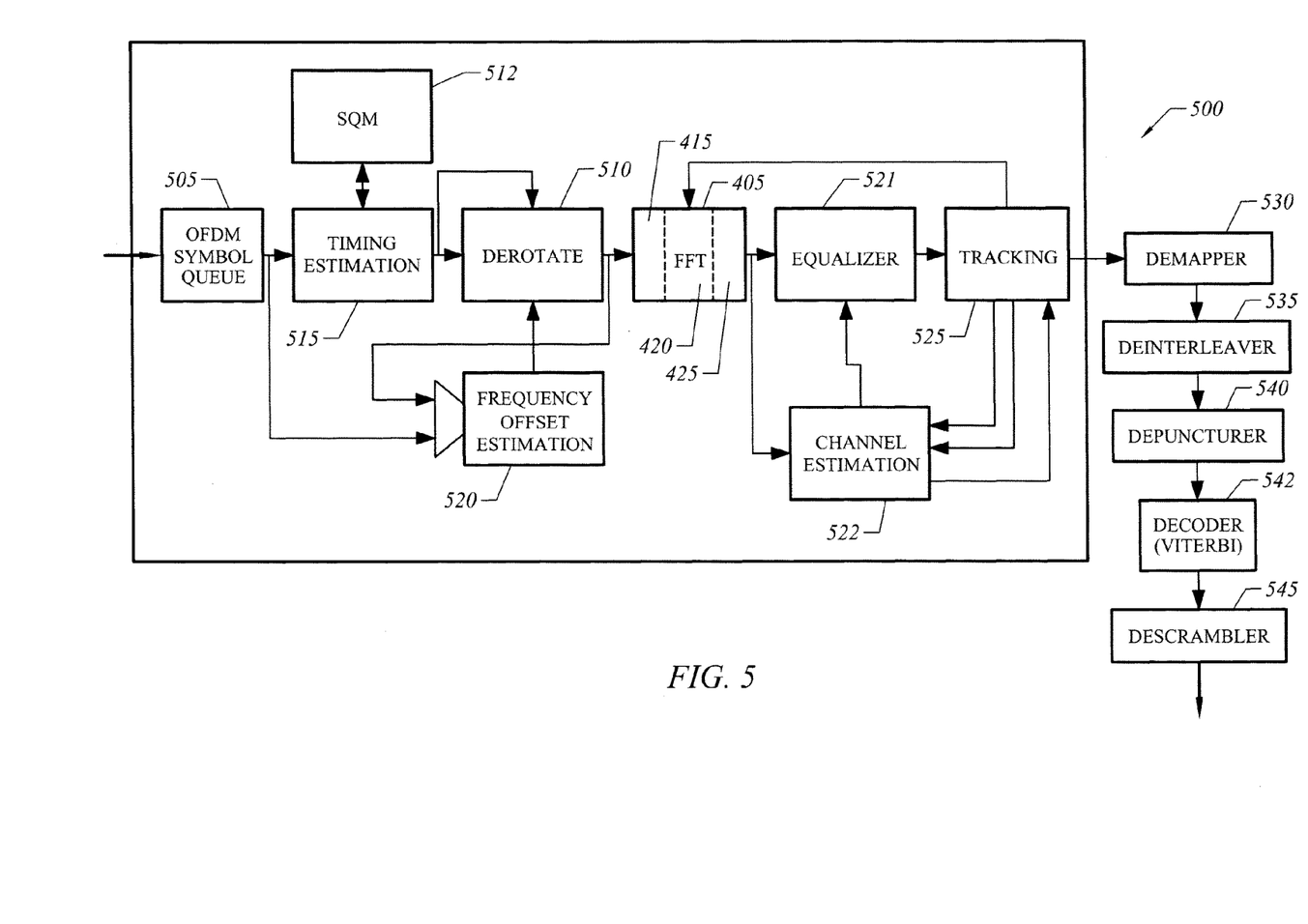
FIG. 5 illustrates a baseband processor in accordance with one embodiment of the present invention.

FIG. 5 illustrates in more detail a baseband processor 500 for a receiver in accordance with one embodiment of the present invention. A first in first out (FIFO) symbol queue 505 receives an input stream of data. For an OFDM system, symbol queue 505 is an OFDM symbol queue. Baseband processor 500 includes modules for performing receiver synchronization to the transmitted signal, such as a timing estimation module 515 to determine coarse timing adjustments, frequency offset estimation module 520 to determine coarse/fine frequency adjustments, and a tracking module 525 to correct fractional timing/carrier errors and provide an error signal fed back to the first stage 415 of FFT module 405. Baseband processor 500 also preferably includes a signal quality measurement (SQM) module 512, which is a diagnostic tool used by a software layer (not shown) for determining the quality of the link. For example, SQM module 512 may be used by software to display a bar graph of link quality to a user.

A derotation module 510 reduces phase errors in the received data. FFT module 405 performs FFT operations on derotated data received from derotation module 510. An equalizer 521 is preferably coupled to the output of FFT module 405 to compensate for channel distortion using estimated channel characteristics. A channel estimation module 522 is coupled to tracking module 525 and generates an estimate of channel characteristics that is used by equalizer 521 to compensate for channel distortion.

The output of FFT module 405 (as modified by any channel equalization performed by equalizer 521) is then sent to a demapper 530, deteinterleaver 535, depuncturer 540, decoder 542 (e.g., a viterbi decoder) and descrambler 545 to perform other conventional operations subsequent to FFT 405 required to process OFDM signals in a baseband processor.

Figure 6:
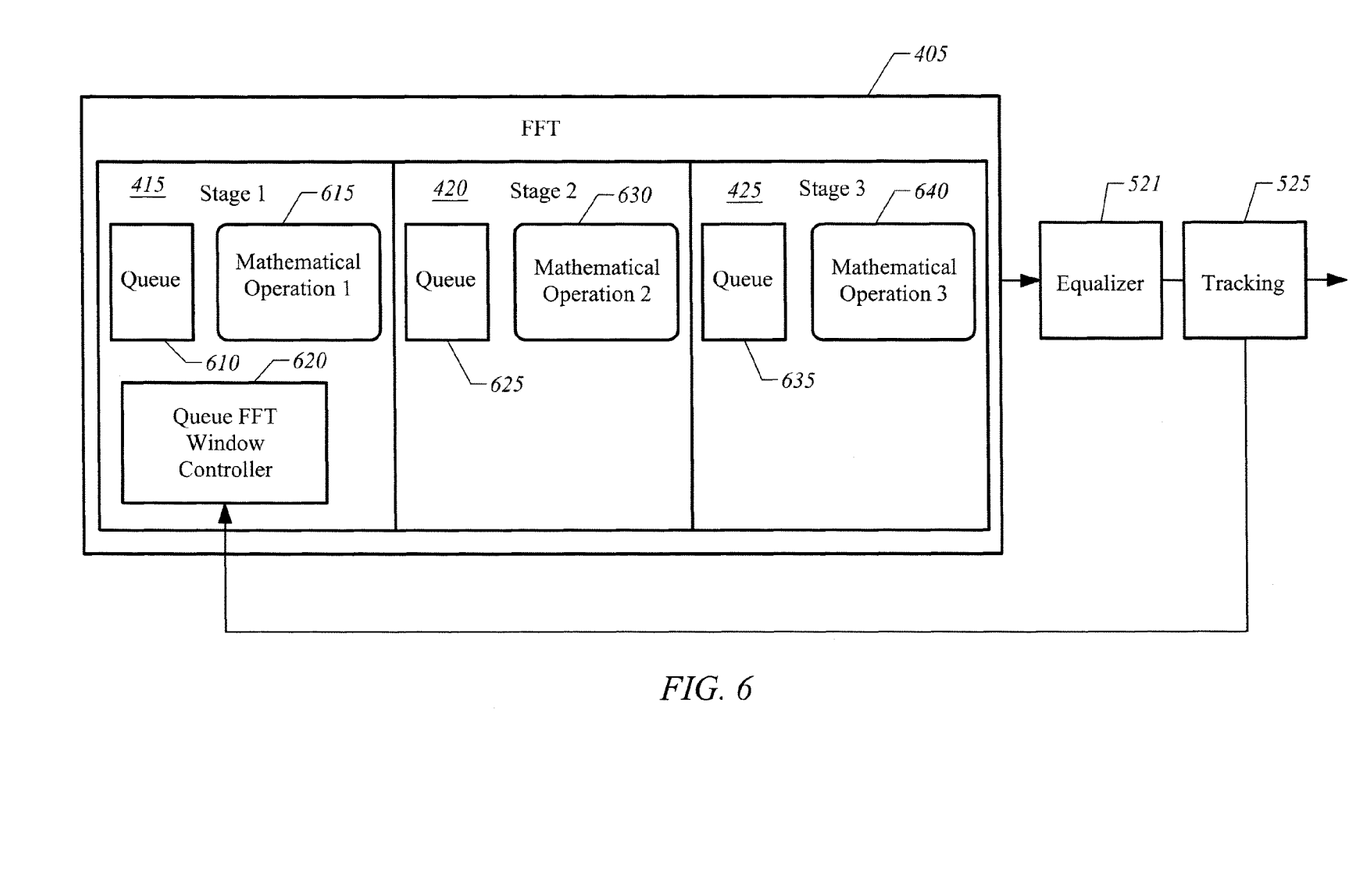
FIG. 6 illustrates a FFT module for use in a baseband processor in accordance with one embodiment of the present invention.

FIG. 6 illustrates in more detail an embodiment of FFT module 405. The first stage 415 includes an input queue 610 for receiving samples and buffering the samples for further processing. First stage 415 includes a first mathematical operation module 615, such as a butterfly stage. A group of samples corresponding to a number of samples for a symbol is input to first mathematical operation module 615 and then sequentially operated on by each subsequent stage 420 and 425 to perform FFT processing. Subsequent stages 420 and 425 each include respective queues 625 and 635 for buffering data for performing mathematical operations in respective mathematical operation modules 630 and 640.

In one embodiment, input queue 610 has data slots for buffering data and a corresponding set of data addresses for each entry slot in the input queue. For example, input queue 610 may have addresses $a_0 \ldots a_k$, where the total range of addresses is greater than the number of samples, M, to be processed in parallel by FFT module 405 in a particular FFT processing cycle. Input queue 610 has a buffer size preferably greater than the size required to store the group of samples for a symbol by at least two samples. In one embodiment address pointers are used to adjust a FFT window of samples within queue 610 that are sent to mathematical operation module 615 as a group for FFT processing. In other words, the address pointers to samples in queue 610 may be adjusted up or down with respect to slot address numbers to achieve the effect of sliding the FFT timing window. In one embodiment a queue FFT window controller 620 receives an error signal from tracking module 525 and adjusts pointers to determine a window of samples in queue 610 that are processed by mathematical operations module 615. The error signal may, for example, correspond to a step or repeat signal that adjusts the timing window up or down by an increment of sample, respectively.

Figure 7:
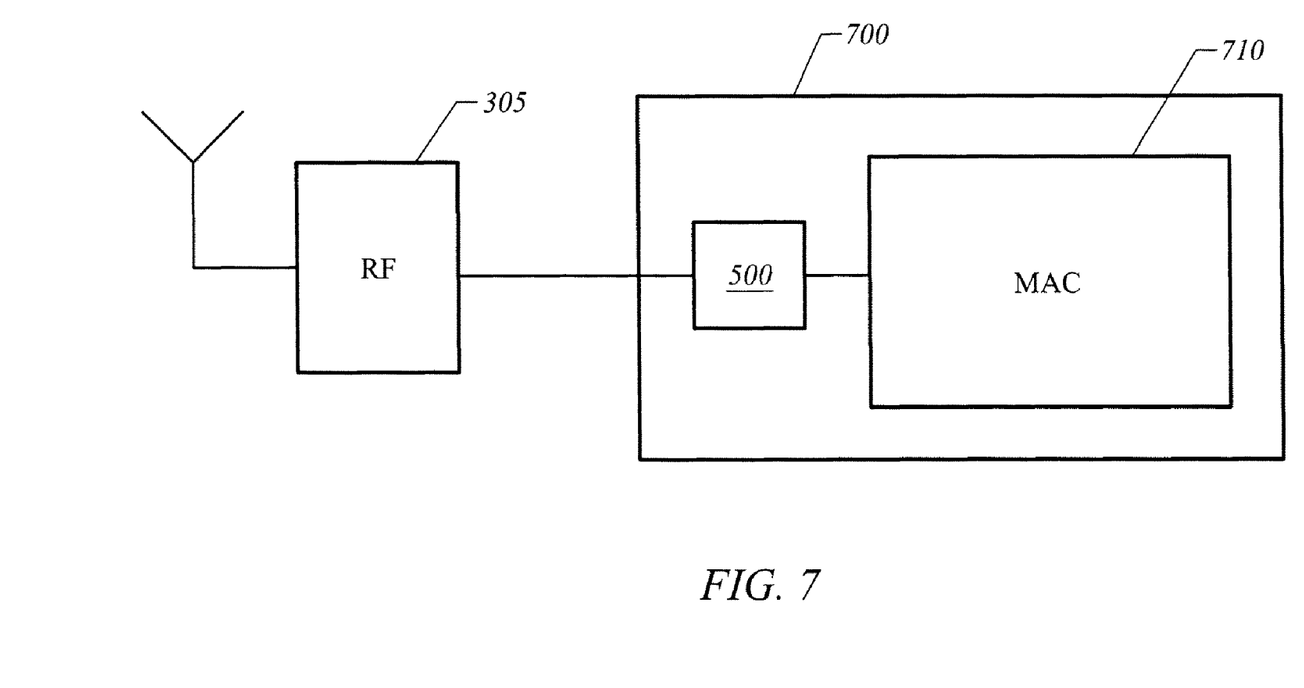
FIG. 7 illustrates a baseband processor embedded in an IC in accordance with one embodiment of the present invention.

FIG. 7 illustrates an embodiment in which baseband processor 500 is integrated onto an integrated circuit 700 performing other processing requiring for a WLAN system. In one embodiment, integrated circuit 700 includes a media access control (MAC) module 710. Integrated circuit 700 may have additional media and communication processing devices into it to form a media and communications processor.

While the present invention has been described in regards to an OFDM implementation, it will be understood that the present invention may also be adapted for use in other baseband processors that utilize a FFT module to process a group of samples.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A pipelined multi-stage Fast Fourier Transform (FFT) Module for a baseband processor of a receiver, comprising:
   a first stage having a first sample queue within the first stage and a first FFT sub-module, the first sample queue having a buffer size greater than a number of samples to be processed as a group by the first FFT sub-module to perform a first set of FFT processing operations;
   a second stage receiving an output of the first stage and having a second sample queue and a second FFT sub-module to perform a second set of FFT processing operations;
   a third stage receiving an output of the second stage and having a third queue and a third FFT sub-module to perform a third set of FFT processing operations;
   a queue controller associated with the first stage acting in response to an error signal to adjust a timing window for samples within the first sample queue of said first stage to define the group of samples for FFT processing;
   said FFT module operative to perform FFT processing upon said group of samples defined by said timing window;
   wherein said FFT module is configured to adjust the timing window for samples that have been previously received and are being buffered in said first sample queue.

2. The FFT module of claim 1, wherein said queue controller defines said group of samples by selecting address pointers of a group of samples in said first sample queue.

3. The FFT module of claim 1, wherein said receiver is an orthogonal frequency division multiplexed (OFDM) receiver.

4. The FFT module of claim 1 wherein said FFT module is organized as a multi-stage FFT module and said first sample queue is disposed in a first stage of said FFT.

5. The FFT module of claim 1, further comprising a tracker, said tracker detecting sample synchronization and generating said error signal.

6. The FFT module of claim 5, wherein said error signal comprises a skip signal and a repeat signal to adjust said timing window.

7. The FFT module of claim 1, wherein said FFT module is organized as a sequence of stages each including a respective queue for buffering data and a mathematical operations module.

8. The FFT module of claim 1, wherein said receiver is a wireless local area network receiver.

9. A baseband processor, comprising:
a pipelined multi-stage Fast Fourier Transform (FFT) Module configured to adjust a FFT timing window upon samples within an input queue of said FFT module, the FFT module including:
a first stage having a first sample queue within the first stage and a first FFT sub-module, the first sample queue having a buffer size greater than a number of samples to be processed as a group by the first FFT sub-module performing a first set of FFT processing operations;
a second stage receiving an output of the first stage and having a second sample queue and a second FFT sub-module performing a second set of FFT processing operations;
a third stage receiving an output of the second stage and having a third queue and a third FFT sub-module performing a third set of FFT processing operations;
a queue controller associated with the first stage acting in response to an error signal to adjust a timing window for samples within the first sample queue of said first stage to define the group of samples for FFT processing; and
a tracker operative to monitor an output of said FFT module and generate said error signal wherein said FFT module is configured to adjust the timing window for samples that have been previously received and are being buffered in said first sample queue.

10. The baseband processor of claim 9, wherein said FFT module selects address pointers to adjust said FFT timing window.

11. The baseband processor of claim 9, wherein said baseband processor is integrated with a media access controller.

12. The baseband processor of claim 9, wherein said baseband processor processes orthogonal frequency division multiplexed signals.

13. The baseband processor of claim 12, wherein said baseband processor is a component of a wireless local area network (WLAN) receiver.

14. The baseband processor of claim 13, wherein said baseband processor is integrated with a media access Controller.

* * * * *